United States Patent
Holcomb et al.

(10) Patent No.: US 9,677,249 B2
(45) Date of Patent: Jun. 13, 2017

(54) WORK VEHICLE WITH STOWABLE USER SUPPORT MEMBER

(71) Applicant: KOMATSU LTD., Tokyo (JP)

(72) Inventors: Noah Holcomb, Chattanooga, TN (US); William Schierschmidt, Chattanooga, TN (US); Gene Huleman, Chattanooga, TN (US); Nobufumi Kinoshita, Chattanooga, TN (US)

(73) Assignee: KOMATSU LTD., Tokyo (JP)

( * ) Notice: Subject to any disclaimer, the term of this patent is extended or adjusted under 35 U.S.C. 154(b) by 31 days.

(21) Appl. No.: 14/626,364

(22) Filed: Feb. 19, 2015

(65) Prior Publication Data

US 2016/0244947 A1 Aug. 25, 2016

(51) Int. Cl.
*B60R 3/00* (2006.01)
*E02F 9/08* (2006.01)
*B60R 3/02* (2006.01)

(52) U.S. Cl.
CPC .............. *E02F 9/0891* (2013.01); *B60R 3/02* (2013.01); *E02F 9/0833* (2013.01)

(58) Field of Classification Search
CPC ........ E02F 9/0891; E02F 9/0833; E06C 5/00; E06C 5/04; E06C 5/06; B60R 3/00; B60R 3/02; B60R 3/005; B60R 3/007; B62D 25/12; B62D 25/10; B62D 25/105
See application file for complete search history.

(56) References Cited

U.S. PATENT DOCUMENTS

| | | | | |
|---|---|---|---|---|
| 3,796,456 A | * | 3/1974 | Bergeson | B60R 3/02 182/88 |
| 4,244,443 A | * | 1/1981 | Naka | E06C 1/125 182/100 |
| 4,738,291 A | * | 4/1988 | Isley | A01G 23/091 144/223 |
| 5,988,316 A | * | 11/1999 | Hedley | B60R 3/02 182/127 |
| 6,045,157 A | * | 4/2000 | Poulin | B60R 3/005 182/113 |
| 6,179,312 B1 | * | 1/2001 | Paschke | B60R 3/02 105/444 |
| 6,264,222 B1 | * | 7/2001 | Johnston | B60R 3/02 105/444 |
| 6,347,686 B1 | * | 2/2002 | Hedley | B60R 3/02 182/127 |

(Continued)

*Primary Examiner* — James M Dolak
(74) *Attorney, Agent, or Firm* — Global IP Counselors, LLP

(57) ABSTRACT

A work vehicle includes a vehicle body, a vehicle cover, at least one user support member and a deployment structure. The body supports at least one serviceable component. The cover is movably mounted to the body to move between a closed position and an open position. The vehicle cover at least partially covers the serviceable component(s) in the closed position, and the cover permits access to the serviceable component(s) in the open position. The user support member(s) is movably mounted to the body to move between a stowed position and a deployed position. The deployment structure is operatively coupled to the user support member(s) to move the user support member(s) from the stowed position to the deployed position in response to movement of the cover from the closed position to the open position.

20 Claims, 10 Drawing Sheets

(56) References Cited

U.S. PATENT DOCUMENTS

| | | | | |
|---|---|---|---|---|
| 6,810,979 B2* | 11/2004 | Johansson | ................ | B60R 3/02 |
| | | | | 180/69.21 |
| 7,237,636 B2* | 7/2007 | Ruppert | ................... | B60R 3/00 |
| | | | | 180/210 |
| 7,780,213 B2* | 8/2010 | Kim | ......................... | E02F 9/00 |
| | | | | 296/37.6 |
| 7,967,094 B2 | 6/2011 | Matsushita et al. | | |
| 7,988,167 B2* | 8/2011 | Sakitani | ................... | B60R 3/00 |
| | | | | 280/163 |
| 8,827,038 B2* | 9/2014 | Salzman | ................... | E06C 5/22 |
| | | | | 182/127 |
| 9,233,646 B2* | 1/2016 | Koshy | ..................... | B60R 3/005 |
| 9,447,638 B2* | 9/2016 | Hedley | ................... | E06C 1/393 |
| 9,481,307 B2* | 11/2016 | Koshy | ..................... | B60R 3/005 |
| 9,487,145 B2* | 11/2016 | Koshy | .................. | E02F 9/0816 |
| 9,500,029 B1* | 11/2016 | Grover | ................... | E06C 1/393 |
| 2001/0030081 A1* | 10/2001 | Morimoto | ................ | B60R 3/02 |
| | | | | 182/85 |
| 2008/0122211 A1* | 5/2008 | Kang | ..................... | B60R 3/005 |
| | | | | 280/762 |
| 2014/0041964 A1* | 2/2014 | Bedyk | ....................... | E06C 5/04 |
| | | | | 182/106 |

* cited by examiner

WORK VEHICLE WITH STOWABLE USER SUPPORT MEMBER

BACKGROUND

Field of the Invention

The present invention generally relates to a work vehicle. More specifically, the present invention relates to a work vehicle having at least one user support member.

Background Information

A work vehicle is a machine used in construction, mining, forestry, farming, etc. Such work vehicles typically have several serviceable components, which should be checked or inspected daily. The serviceable components also need to be periodically serviced and/or repaired. Furthermore, with certain work vehicles debris needs to be routinely removed from areas where the serviceable components are located. Typical work vehicles have a hood covering the serviceable components. The hood can be opened to gain access to the components. One example of a work vehicle having a hood covering the serviceable components is disclosed in U.S. Pat. No. 7,967,094. A person needs to climb up on the work vehicle to perform maintenance operations on such work vehicles.

SUMMARY

It has been discovered that it can be a challenge to access the serviceable components and perform inspection, service, maintenance, repair and/or debris removal on work vehicles.

Therefore, one object of the present invention is to provide a work vehicle, which improves access to the serviceable components.

In order to improve accessibility to the work vehicle, access support members such as handrails and steps can be provided. However, when such access support members are provided in the work vehicle, it has been further discovered that there is a possibility that these access support members can interfere with unforeseen objects (i.e., obstacles such as debris, building material).

Therefore, another object of the present invention is to provide a work vehicle, which protects all or partial access support members.

In view of the state of the known technology and in accordance with a first aspect of the present disclosure, a work vehicle is basically provided that comprises a vehicle body, a vehicle cover, at least one user support member and a deployment structure. The vehicle body supports at least one serviceable component. The vehicle cover is movably mounted to the vehicle body to move between a closed position and an open position. The vehicle cover at least partially covers the at least one serviceable component in the closed position, and the vehicle cover permits access to the at least one serviceable component in the open position. The at least one user support member is movably mounted to the vehicle body to move between a stowed position and a deployed position. The deployment structure is operatively coupled to the at least one user support member to move the at least one user support member from the stowed position to the deployed position in response to movement of the vehicle cover from the closed position to the open position.

Also other objects, features, aspects and advantages of the disclosed work vehicle will become apparent to those skilled in the work vehicle field from the following detailed description, which, taken in conjunction with the annexed drawings, discloses one embodiment of the work vehicle.

BRIEF DESCRIPTION OF THE DRAWINGS

Referring now to the attached drawings which form a part of this original disclosure.

DETAILED DESCRIPTION OF THE EMBODIMENT(S)

Selected embodiments of the present invention will now be explained with reference to the drawings. It will be apparent to those skilled in the work vehicle field from this disclosure that the following descriptions of the embodiments of the present invention are provided for illustration only and not for the purpose of limiting the invention as defined by the appended claims and their equivalents.

Figure 1:
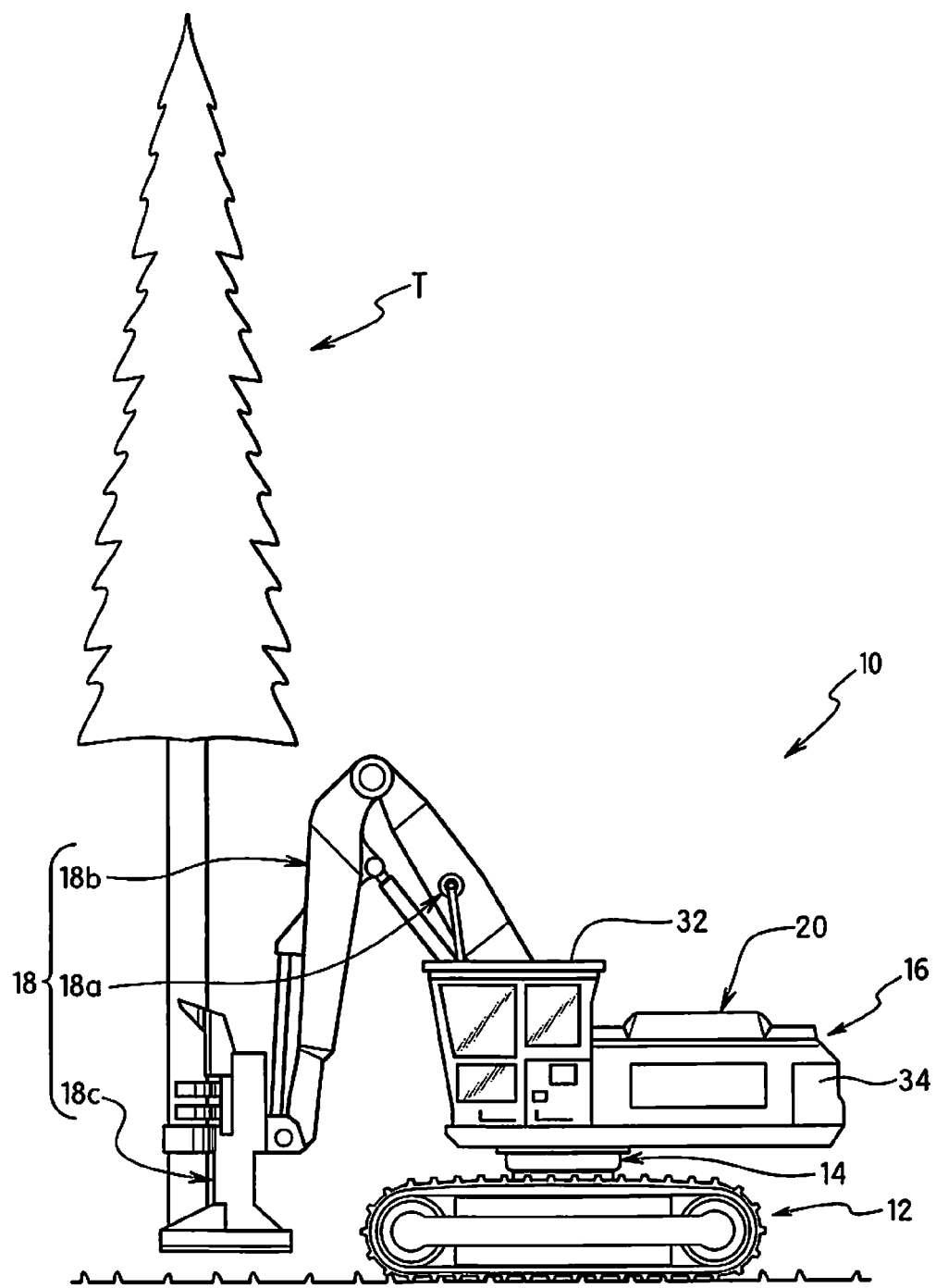
FIG. 1 is a side elevational view of a work vehicle in accordance with a first embodiment.

Referring initially to FIG. 1, a work vehicle 10 is illustrated in accordance with a first embodiment. In the illustrated embodiment, the work vehicle 10 is a tracked work vehicle that includes a traveling apparatus 12, a pivotal attachment structure 14, a vehicle body 16, a work implement 18 and a vehicle cover 20. Therefore in the illustrated embodiment, the traveling apparatus 12 has a pair of tracks used to propel and maneuver the work vehicle 10 in a conventional manner. The vehicle body 16 is supported by and attached to the traveling apparatus 12 via the pivotal attachment structure 14. The work implement 18 is movably attached to the vehicle body 16. The vehicle cover 20 is movably mounted to the vehicle body 16.

In the illustrated embodiment, the work implement 18 is a forestry implement. More specifically, in the illustrated embodiment, the work implement 18 includes a boom 18a, an arm 18b and a feller head 18c. The boom 18a has a first portion movably attached to the vehicle body 16 and a second portion attached to the arm 18b. The arm 18b has a first portion movably attached to the boom 18a and a second portion with the feller head 18c attached thereto. A pivotal connection attaches the first portion to the second portion in a conventional manner. FIG. 1 illustrates the feller head 18c in a state of holding a tree T after the tree T has been cut down. Thus, the work vehicle 10 illustrated herein is a feller buncher. While the work vehicle 10 illustrated herein is particularly suited to such a forestry work vehicle due to the need for frequent debris removal on such forestry work vehicles, it will be apparent to those skilled in the work vehicle field from this disclosure that the present invention is applicable to any work vehicle (e.g., harvester, log loader, and shovel) in which improved access to components to perform inspection, service, maintenance, repair and/or debris removal is useful.

In addition, while in the illustrated embodiment, the work vehicle 10 is a tracked work vehicle, it will be apparent to those skilled in the work vehicle field from this disclosure that the present invention is also applicable the wheeled work vehicles in which the traveling apparatus 12 is replaced by wheels. Furthermore, in the illustrated embodiment, the work vehicle 10 is a long tail non-levelling work vehicle. However, it will be apparent to those skilled in the work vehicle field from this disclosure that the present invention is also applicable to short tail and/or levelling work vehicles.

Figure 2:
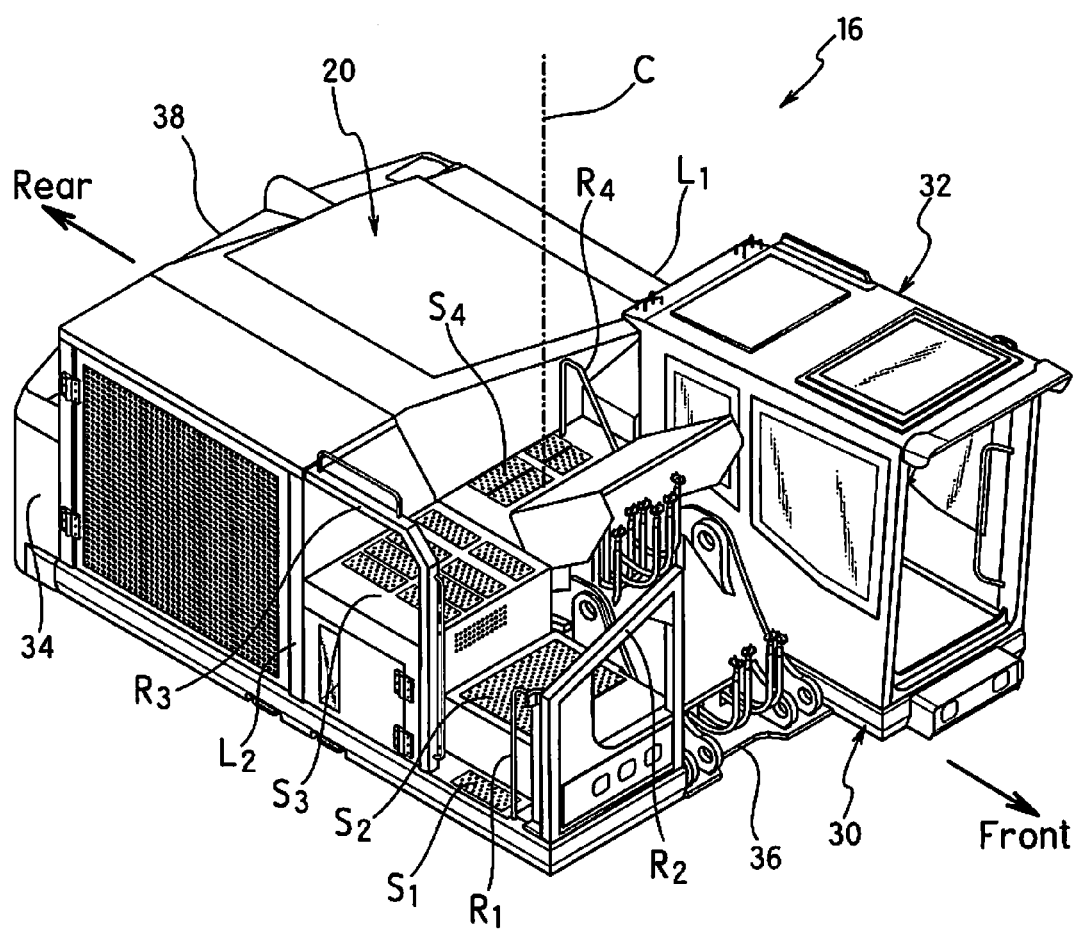
FIG. 2 is an enlarged front perspective view of the work vehicle illustrated in FIG. 1, with the traveling apparatus and the work implement removed for the purpose of illustration and with the cover member in a closed position.
Figure 3:
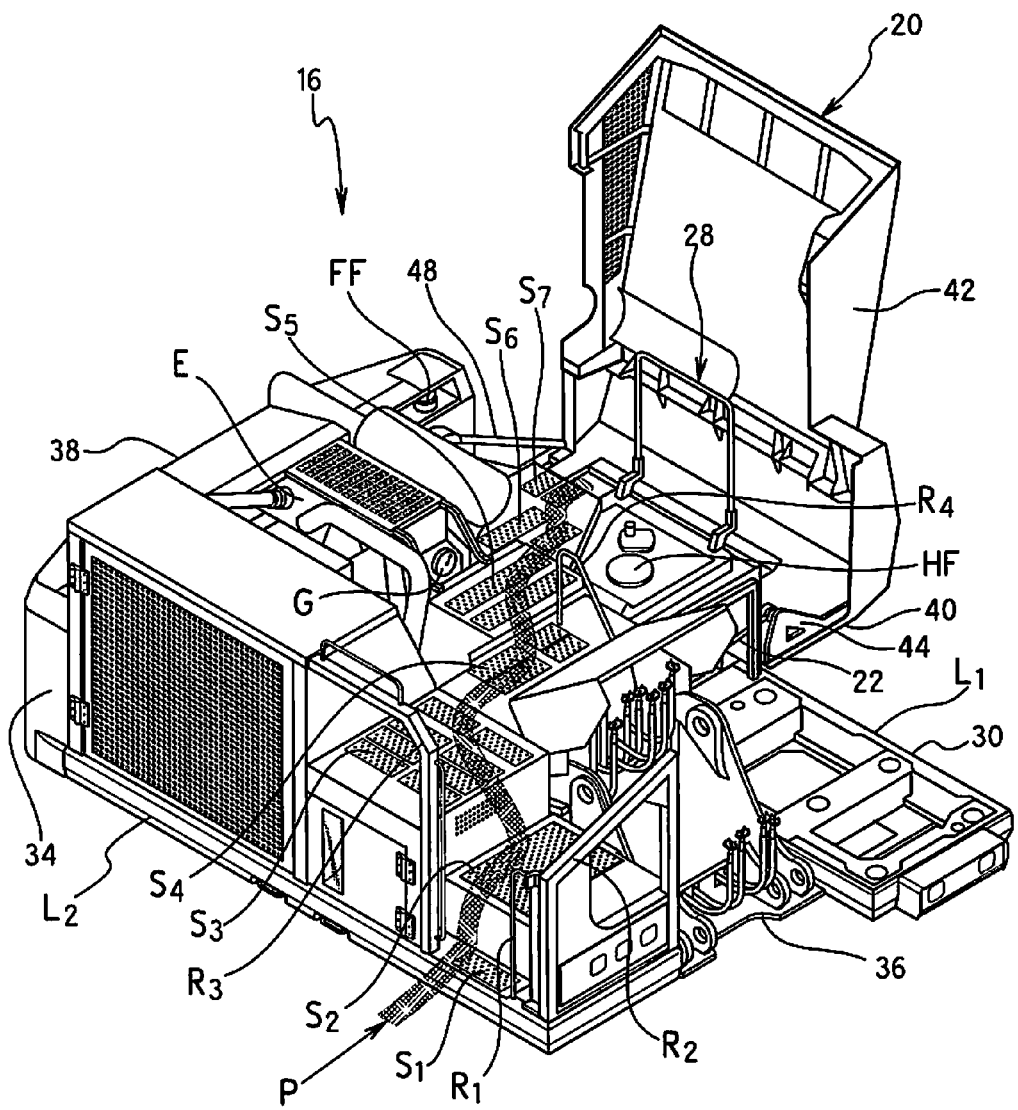
FIG. 3 is a front perspective view of the work vehicle illustrated in FIG. 1, with the traveling apparatus, the work implement and the cab removed for the purpose of illustration and with the cover member in an open position.
Figure 4:
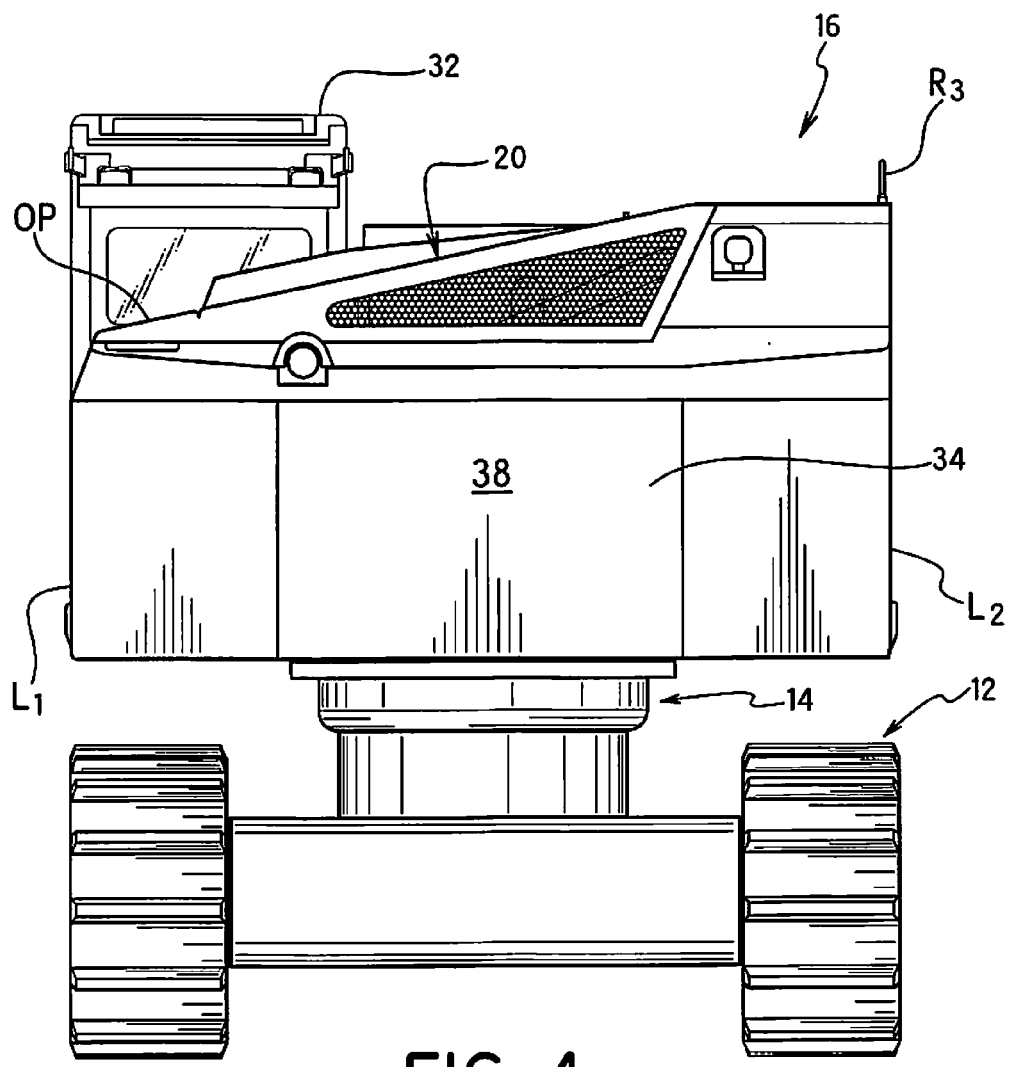
FIG. 4 is a rear elevational view of the work vehicle illustrated in FIG. 1, with the work implement removed for the purpose of illustration and with the cover member in the closed position.
Figure 5:
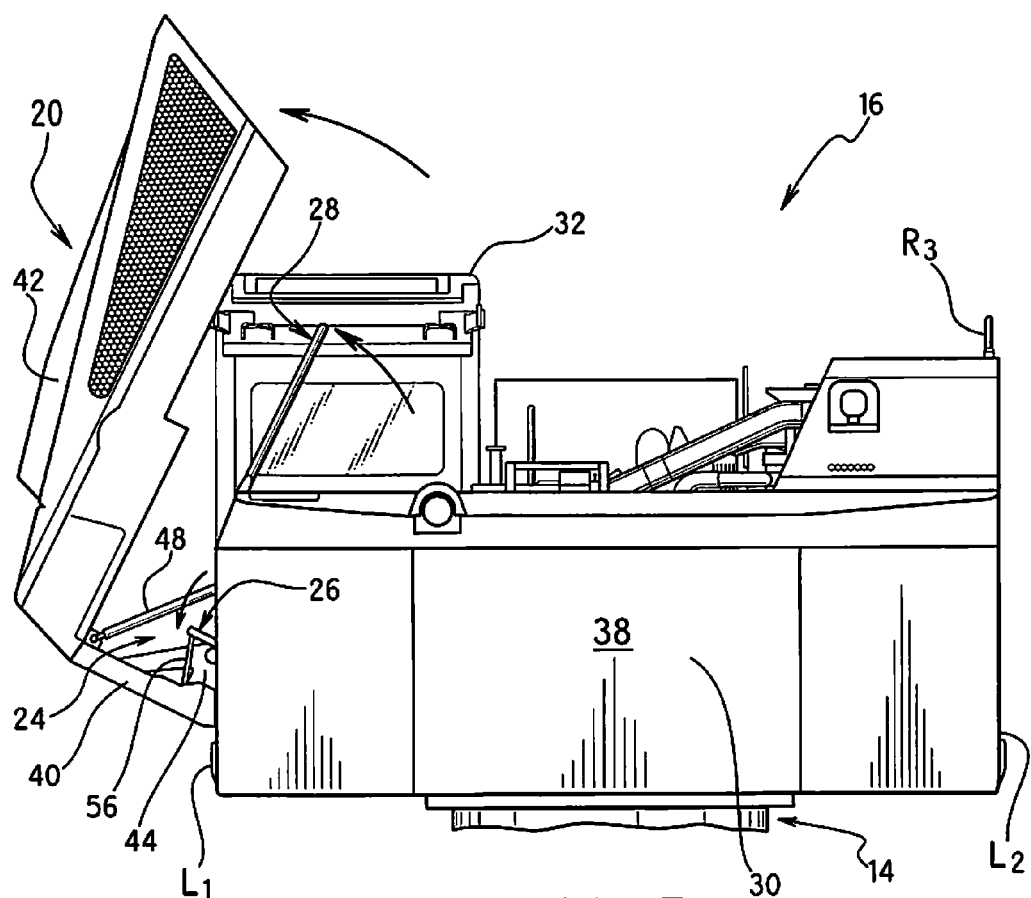
FIG. 5 is a rear elevational view of the work vehicle illustrated in FIG. 1, with the work implement and the traveling apparatus removed for the purpose of illustration and with the cover member in an intermediate (partially open, ajar) position.
Figure 6:
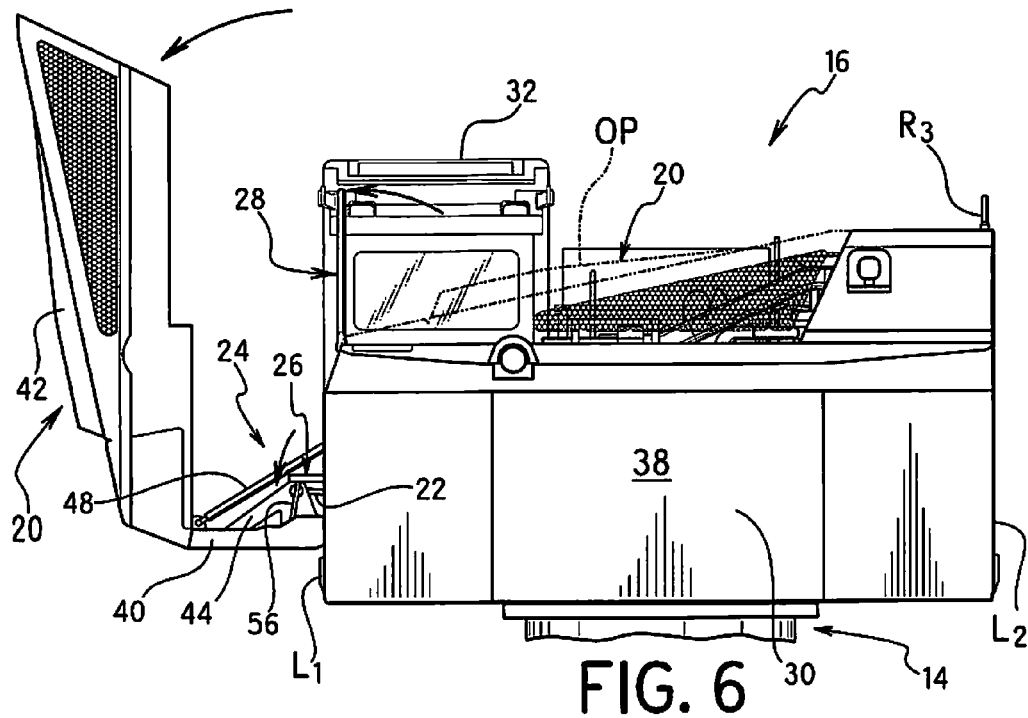
FIG. 6 is a rear elevational view of the work vehicle illustrated in FIG. 1, with the work implement and traveling apparatus removed for the purpose of illustration and with the cover member in the open position.

Referring now to FIGS. 2-6, the work vehicle 10 further includes a hydraulic cylinder 22, a deployment structure 24, a retractable step 26 and a retractable handrail 28. In FIGS. 2, 3, 5 and 6, the traveling apparatus 12 and the work implement 18 are removed for the purpose of illustration. In FIG. 4 only the work implement 18 is removed for the purpose of illustration. FIGS. 2-3 are similar views. However, in FIG. 2, the vehicle cover 20 is closed and the retractable step 26 and the retractable handrail 28 are stowed. On the other hand, in FIGS. 3, 6 and 9, the vehicle cover 20 is opened and the retractable step 26 and the retractable handrail 28 are deployed. FIGS. 4-6 are also similar, rear elevational views but depicting different states of the vehicle cover 20, the retractable step 26 and the retractable handrail 28. In FIG. 4, the vehicle cover 20 is closed and the retractable step 26 and the retractable handrail 28 are stowed. In FIG. 5, the vehicle cover 20 is partially open (ajar) and the retractable step 26 and the retractable handrail 28 are in intermediate (partially deployed) positions. In FIG. 6, the vehicle cover 20 is opened and the retractable step 26 and the retractable handrail 28 are deployed.

As can be seen from FIGS. 4-6, the vehicle cover 20 is movably mounted to the vehicle body 16 to move between a closed position and an open position. In particular, the vehicle cover 20 is pivotally mounted to the vehicle body 16 to pivot around a first pivot axis $P_1$ (FIG. 11) which is a stationary or fixed pivot axis with respect to the vehicle body 16 and the vehicle cover 20. When the vehicle cover 20 is in the closed position, the vehicle cover 20 defines a portion of an outer periphery OP of the vehicle body 16, as seen in FIG. 4. The retractable step 26 and the retractable handrail 28 are disposed within the outer periphery OP of the vehicle body 16 when the retractable step 26 and the retractable handrail 28 are in the stowed positions and the vehicle cover 20 is in the closed position. The retractable step 26 and the retractable handrail 28 project outwardly from the outer periphery OP of the vehicle body 16, defined partially by the vehicle cover 20 in the closed position, when the retractable step 26 and the retractable handrail 28 are in the deployed positions and the vehicle cover 20 is in the open position, as seen FIG. 6.

The hydraulic cylinder 22 is operatively connected between the vehicle body 16 and the vehicle cover 20 to move (pivot) the vehicle cover 20 between the closed position and the open position in response to actuation of the hydraulic cylinder 22. A hydraulic pump (not shown) is connected to the hydraulic cylinder 22 in order to actuate the hydraulic cylinder to open/close the vehicle cover 20, as discussed in more detail below. In the illustrated embodiment, the deployment structure 24 is operatively connected to the vehicle cover 20, the retractable step 26 and the retractable handrail 28 to move the retractable step 26 and the retractable handrail 28 between stowed positions (FIGS. 1, 2 and 4) and deployed positions (FIGS. 3 and 6). Therefore, when the hydraulic cylinder 22 is actuated to move the vehicle cover 20, the retractable step 26 and the retractable handrail 28 are also moved, as explained in more detail below. The deployment structure 24 will be discussed in more detail below.

The retractable step 26 and the retractable handrail 28 are movably mounted to the vehicle body 16 to move between stowed positions and deployed positions. The retractable step 26 and the retractable handrail 28 are user support members. A user support member is a member that is useable to support a user, who may be inspecting, servicing, repairing and/or removing debris from the work vehicle 10. In the illustrated embodiment, the retractable step 26 is useable to support a user's foot, while the retractable handrail 28 is useable to support a user's hand. In addition, the retractable handrail 28, when in the deploy position serves a barrier at an upper edge of the vehicle body 16.

The illustrated embodiment includes both the retractable step 26 and the retractable handrail 28 as user support members. However, it will be apparent to those skilled in the work vehicle field from this disclosure that additional user support members can be included and/or one of the retractable step 26 and the retractable handrail 28 may be omitted as needed and/or desired based on the configuration of the work vehicle. If the retractable handrail 28 is omitted, then the connection between the retractable step 26 to the retractable handrail 28 (discussed below) is also omitted. If the retractable step 26 is omitted, the vehicle cover 20 is directed connected to the retractable handrail 28 instead of via the retractable step 26. In any case, the work vehicle 10 includes at least one user support member movably mounted to the vehicle body 16 to move between a stowed position and deployed position.

Referring still to FIGS. 1-6, the vehicle body 16 will now be explained in more detail. The vehicle body 16 includes a support frame 30, a cab 32, a counterweight 34 and various support elements/body panels/housings. The cab 32 is mounted on the support frame 30 at a front end 36 thereof.

The counterweight 34 is mounted on the support frame 30 at a rear end 38 thereof. The counterweight 34 balances the work vehicle 10 with respect to the work implement 18. The vehicle body 16 further includes first and second lateral sides $L_1$ and $L_2$ extending between the front and rear ends 36 and 38 thereof. A center C of the vehicle body 16 is centered between the front and rear ends 36 and 38 of the vehicle body 16 and the first and second lateral sides $L_1$ and $L_2$ of the vehicle body 16. In the illustrated embodiment, the first lateral side $L_1$ is a left side and the second lateral side $L_2$ is a right side as viewed from the rear end 38 of the vehicle body 16.

As also best seen in FIG. 3, the support frame 30 of the vehicle body 16 includes various support elements/body panels/housings that define a plurality of steps or user support platforms $S_1$, $S_2$, $S_3$, $S_4$, $S_5$, $S_6$, and $S_7$ as well as various handrails $R_1$, $R_2$, $R_3$ and $R_4$. The retractable step 26 and the steps or user support platforms $S_1$, to $S_7$ form a user support path P that provides a person with easy access to remove debris and to inspect and/or service various serviceable components that are supported by the support frame 30, either directly or via support elements/body panels/housings. For example, in the illustrated embodiment, the retractable step 26 and the steps or user support platforms $S_3$, to $S_7$ provide easy access to serviceable components such as an engine E, an engine oil gauge G, a hydraulic filter HF and a fuel fill FF. Other serviceable components that are accessible from the user support path P include, but not limited to, a power take off oil gauge, a fuel filter, an engine filter, a battery, a Pre-cleaner ejector and a swing machinery oil gauge. The engine E provides mechanical power, which is converted to hydraulic power and/or electric power or which is transferred mechanically to various components in a conventional manner.

In the illustrated embodiment, the retractable step 26 is located on the first lateral side $L_1$ and extends over the vehicle cover 20 while the vehicle cover 20 is in the open position as seen in FIG. 6. With this configuration, a person can walk on the inside of the vehicle cover 20 and easily access the user support path P while the vehicle cover 20 is in the open position. As a result, various serviceable components can be easily accessed while the vehicle cover 20 is in the open position.

In the illustrated embodiment, the steps or user support platforms $S_1$ to $S_7$ are located in order starting on the second lateral side $L_2$ across the vehicle body 16 to the first lateral side $L_1$. The front end 36, the rear end 38 and the second lateral side $L_2$ are sides of the vehicle body 16 remote from the first lateral side $L_1$. Thus, the user support path P traverses the vehicle body 16 from the retractable step 26 on the first lateral side $L_1$ to the second lateral side $L_2$, and vice versa. Of course, it will be apparent from this disclosure that depending on the configuration of the work vehicle, the user support path P can traverse the vehicle body 16 between the front and rear ends 36 and 38 or from one of the lateral sides $L_1$ or $L_2$ to one of the ends 36 and 38. In the case of a work vehicle with a boom, the user support path will typically not extend to the rear end of the work vehicle due to the location of the counterweight.

As seen in FIGS. 2-3, the steps or user support platforms $S_2$ and $S_1$ are sequentially lower than the steps or user support platforms $S_3$, to $S_7$ to form steps useable to access the steps or user support platforms $S_3$, to $S_7$ above. Thus, the steps or user support platforms $S_2$ and $S_1$ form parts of a step structure. Accordingly, the second lateral side $L_2$ of the vehicle body 16 includes a step structure that forms part of the user support path P. The retractable handrail 28 and the handrails $R_1$, $R_2$, $R_3$ and $R_4$ are provided for a person to grip while walking on the steps or user support platforms $S_1$ to $S_7$. The retractable handrail 28 also serves a guard rail when servicing the hydraulic filter HF.

The above serviceable components are mere examples of typical serviceable components mounted on the support frame 30. However, it will be apparent to those skilled in the work vehicle field from this disclosure that additional and/or alternative serviceable components could be included. In addition, while the serviceable components are supported by the support frame 30, the serviceable components can be directly attached to the support frame 30 or indirectly attached to the support frame 30 via various support elements/body panels (e.g., housings). In any case, the vehicle body 16 supports at least one serviceable component.

As seen in FIGS. 2-3, in the illustrated embodiment, the vehicle cover 20 covers at least some of the serviceable components (e.g. the engine E, the engine oil gauge G, the hydraulic filter HF and the fuel fill FF) when the vehicle cover 20 is in the closed position. On the other hand, the vehicle cover 20 permits access to these serviceable components (e.g. the engine E, the engine oil gauge G, the hydraulic filter HF and the fuel fill FF) when the vehicle cover 20 is in the open position. In any case, the vehicle cover 20 at least partially covers the at least one serviceable component in the closed position, and the vehicle cover 20 permits access to the at least one serviceable component in the open position. The term serviceable component refers to a component that normally needs to be serviced (e.g., replaced, tuned, maintained, etc.) or inspected (e.g., gauges) several times during the life of the work vehicle.

Referring now to FIGS. 4-12, the vehicle cover 20, the hydraulic cylinder 22, the deployment structure 24, the retractable step 26, and the retractable handrail 28, will now be explained in more detail. In the illustrated embodiment, the hydraulic cylinder 22 is actuated to move the vehicle cover 20. These movements of the vehicle cover 20 and the deployment structure 24 cause the retractable handrail 28 and the retractable step 26 to also move, as mentioned above. In the illustrated embodiment, the vehicle cover 20, the deployment structure 24, the retractable step 26 and the retractable handrail 28 are disposed on the first (left) lateral side $L_1$ of the vehicle body 16 to form a user support structure on the first (left) lateral side $L_1$ when the vehicle cover 20 is open and the retractable step 26 and the retractable handrail 28 are in their deployed positions.

The vehicle cover 20 is generally a structurally reinforced plate shaped member with a substantially L-shaped cross-sectional profile as seen in FIGS. 5-6. The vehicle cover 20 basically includes a side portion 40 and a top portion 42. The side portion 40 is plate shaped, while the top portion 42 is partially cup-shaped or clam-shaped, as seen in FIG. 3. The side portion 40 is disposed vertically when the vehicle cover 20 is in the closed position, as seen in FIG. 4. The side portion 40 is disposed horizontally when the vehicle cover 20 is in the open position, as seen in FIG. 6, so that a person can walk on the side portion 40. On the other hand, the top portion 42 is disposed horizontally when the vehicle cover 20 is in the closed position, as seen in FIG. 4. The top portion 42 is disposed vertically when the vehicle cover 20 is in the open position, as seen in FIG. 6. The side portion 40 has a perforated opening or grill allowing air to flow to the engine filter (not shown) when the vehicle cover 20 is in the closed position.

In the illustrated embodiment, the vehicle cover 20 further includes a attachment bracket 44 for attaching the hydraulic cylinder 22 thereto. The attachment bracket 44 is fixed to a front end of the side portion 40 of the vehicle cover 20. The attachment bracket 44 has a U-shaped configuration as seen from the first (left) lateral side $L_1$ with the vehicle cover 20 in the open position. The hydraulic cylinder 22 is pivotally coupled to the attachment bracket 44. Therefore, when the hydraulic cylinder 22 is actuated, the vehicle cover 20 is caused to pivot about the first pivot axis $P_1$. Specifically, the side portion 40 has a longitudinal mounting edge that is pivotally coupled to the vehicle body 16 by a pair of hinges that define the first pivot axis $P_1$. The longitudinal mounting edge of the side portion 40 that is pivotally coupled to the vehicle body 16 is spaced from the top portion 42.

Figure 7:
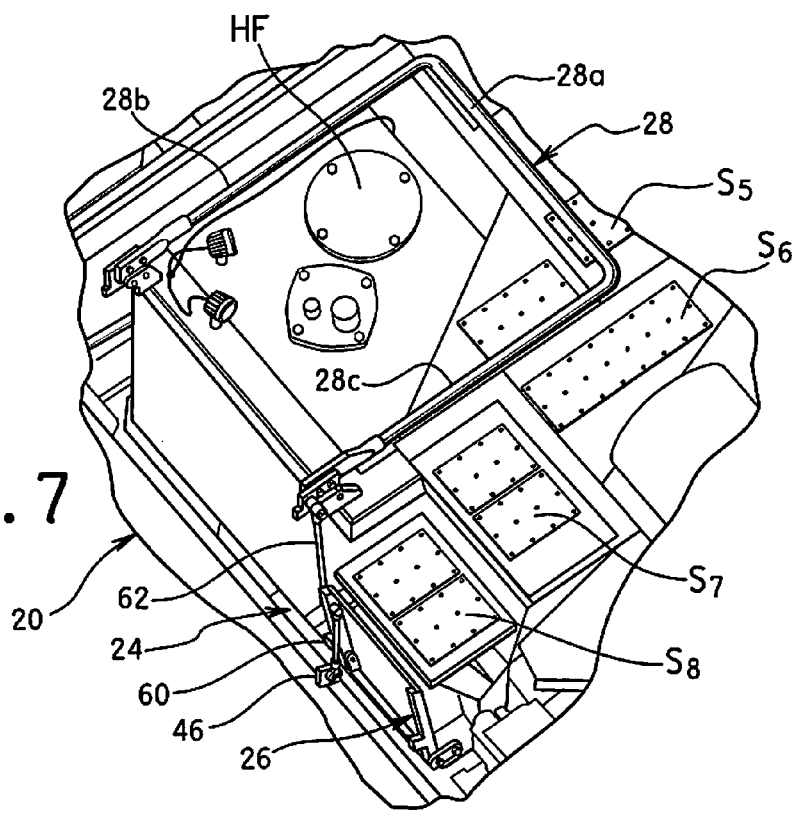
FIG. 7 is a partial top perspective view of the vehicle body of the work vehicle illustrated in FIGS. 1-6, with a retractable handrail and a retractable step in stowed positions and the cover member removed for the purpose of illustration.
Figure 8:
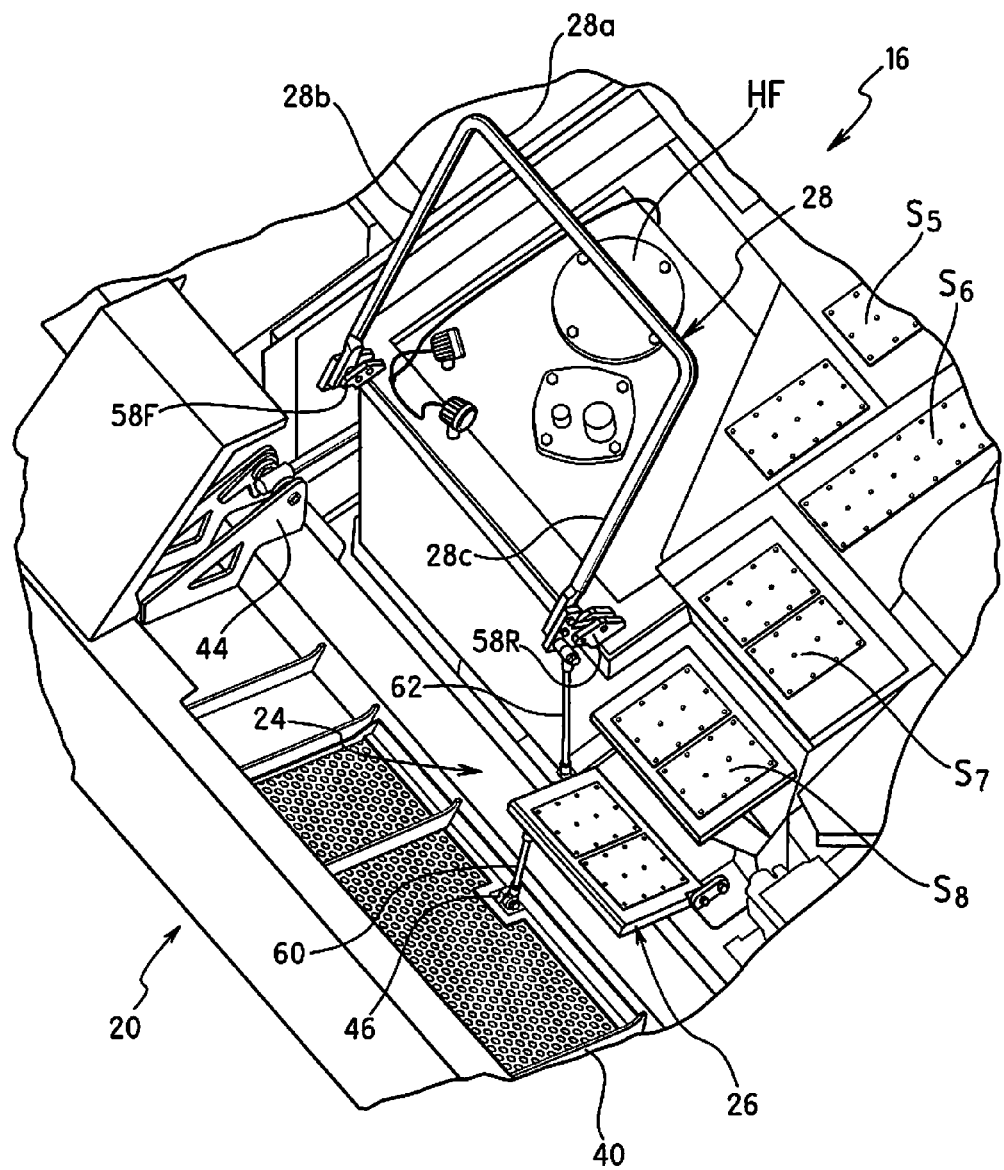
FIG. 8 is a partial top perspective view of the vehicle body of the work vehicle illustrated in FIGS. 1-6, with the retractable handrail, the retractable step and cover member in intermediate (partially deployed, ajar) positions.
Figure 9:
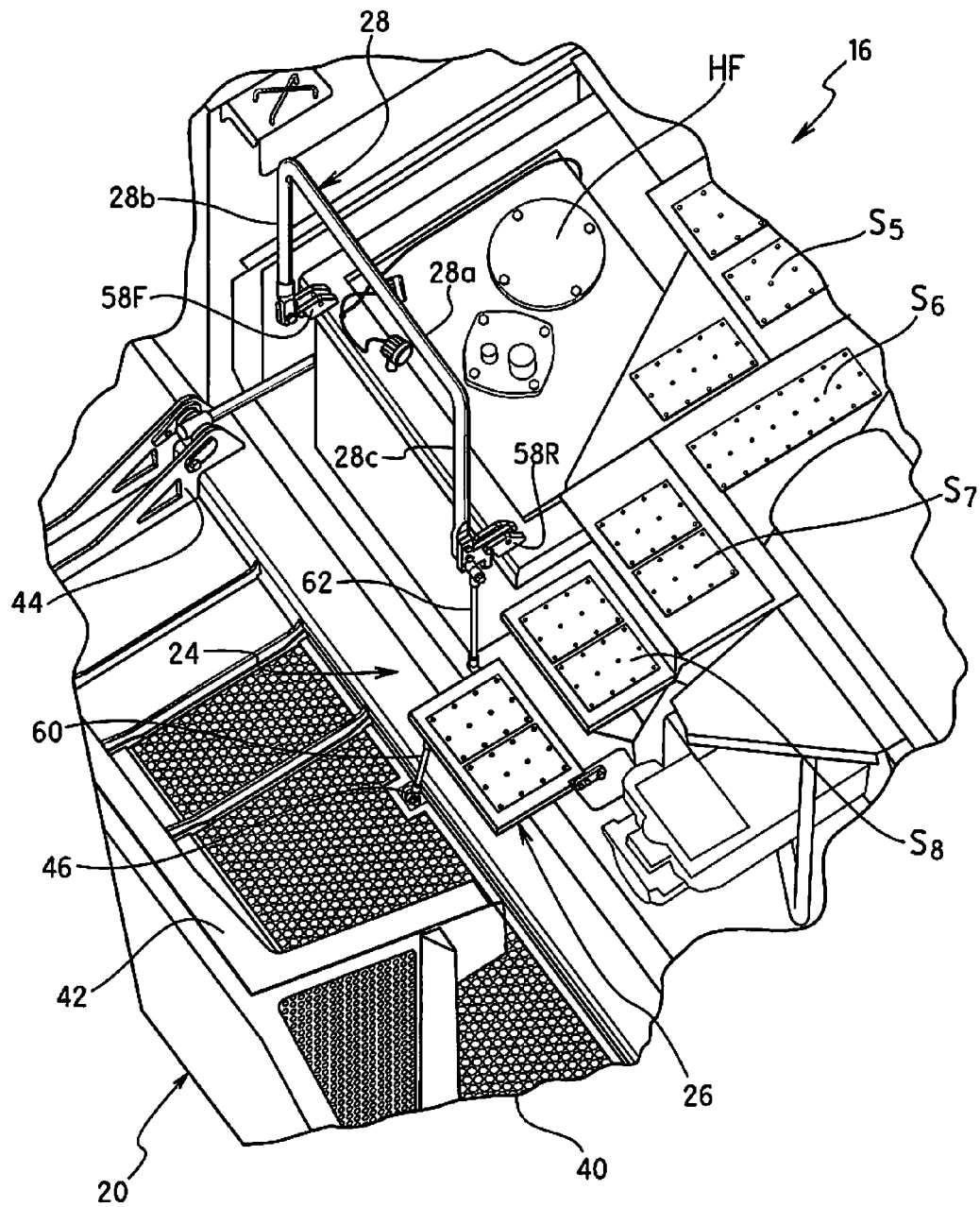
FIG. 9 is a partial top perspective view of the vehicle body of the work vehicle illustrated in FIGS. 1-6, with the retractable handrail, the retractable step and the cover member in deployed or open positions.

In the illustrated embodiment, the vehicle cover 20 further includes an attachment flange 46 that is a plate shaped member that is fixed adjacent to the longitudinal mounting edge of the side portion 40. The attachment flange 46 forms an attachment point for mounting the deployment structure 24 to the vehicle cover 20. In the illustrated embodiment, the attachment flange 46 is located in a position corresponding to a forward facing edge of the retractable step 26, as seen in FIGS. 7-9. The attachment flange 46 is operatively coupled to the retractable step 26, which is operatively coupled to the retractable handrail 28, as explained below in more detail.

In the illustrated embodiment, the vehicle cover 20 further includes a cover support member 48. The cover support member 48 is a rod shaped member in the illustrated embodiment. The cover support member 48 has one end pivotally attached to a rear end of the vehicle cover 20 adjacent to a junction between the side portion 40 and the top portion 42. An opposite end of the cover support member 48 is slideable and pivotal coupled to the vehicle body 16, but retained by the vehicle body 16 to provide support for the rear end of the vehicle cover 20 when the vehicle cover 20 is in the open position.

Figure 11:
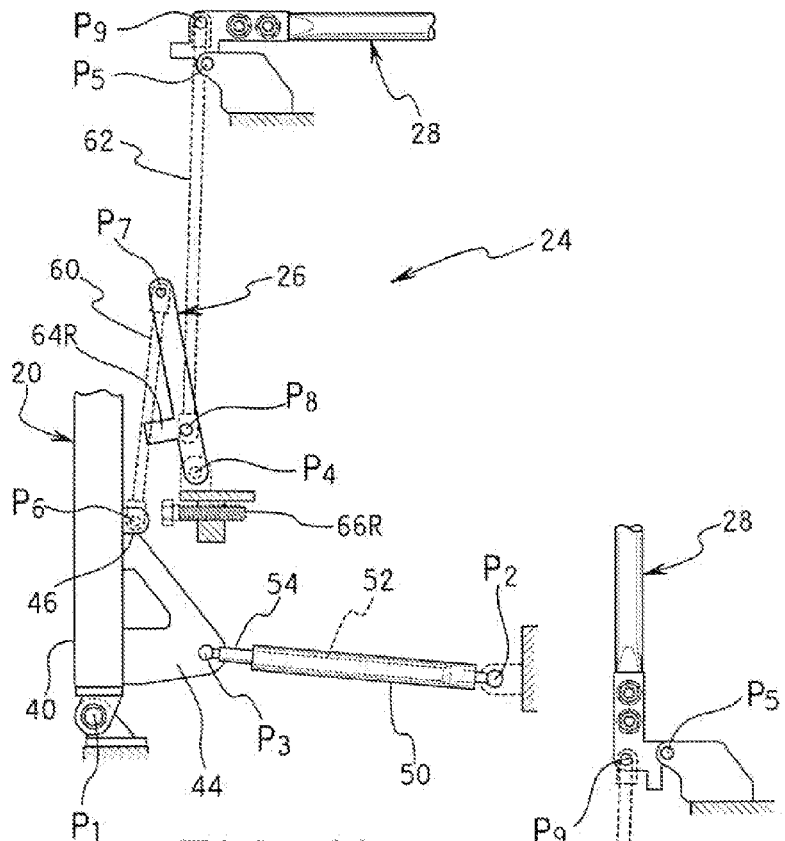
FIG. 11 is a rear schematic illustration of the retractable handrail, the retractable step and the cover member illustrated in FIGS. 1-9, in stowed or closed positions.
Figure 12:
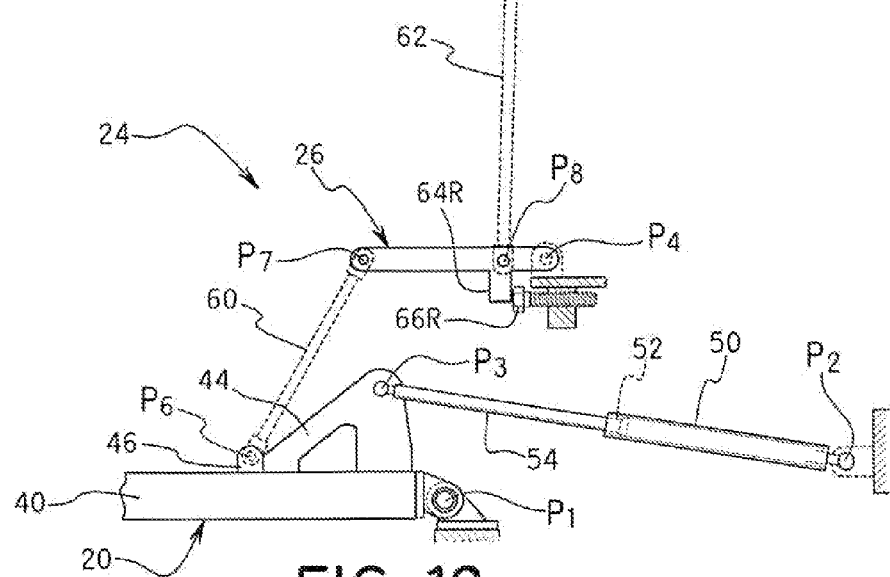
FIG. 12 is a rear schematic illustration of the retractable handrail, the retractable step and the cover member illustrated in FIGS. 1-9, in deployed or open positions.

Referring now to FIGS. 5-9, 11 and 12, the hydraulic cylinder 22 will now be explained in more detail. In the illustrated embodiment, the hydraulic cylinder is pivotally mounted at one end to a support element of the support frame 30, and pivotally mounted at the other end to the front end of the vehicle cover 20 by the attachment bracket 44. As seen in FIGS. 11 and 12, the hydraulic cylinder 22 basically includes a cylinder member 50, a piston member 52 and a push rod 54. The piston member 52 is received in a hydraulic cylinder chamber defined by the cylinder member 50. The push rod 54 has one end attached to the piston member 52 and another end pivotally attached to the attachment bracket 44 of the vehicle cover 20. The cylinder member 50 is fluidly coupled to a hydraulic pump (not shown) so that the piston member 52 and the push rod 54 move longitudinally back and forth relative to the cylinder member 50 in response to activation of the hydraulic pump (not shown) in a conventional manner. The cylinder member 50 has a first end that is pivotally attached to a support element of the support frame 30 to pivot about a second pivot axis $P_2$ which is a stationary or fixed pivot axis with respect to the vehicle body 16. The push rod 54 has a first end located in the hydraulic cylinder chamber defined by the cylinder member 50. The push rod 54 extends out of the cylinder member 50 to a second end that is pivotally attached to the attachment bracket 44 to pivot about a third pivot axis $P_3$ which is a stationary or fixed pivot axis with respect to the vehicle cover 20 but a movable pivot axis with respect to the vehicle body 16.

The retractable step 26 in the illustrated embodiment is a rectangular, plate shaped member disposed on the first (left) lateral side $L_1$ of the vehicle body 16. The retractable step 26 is pivotally attached to the vehicle body 16 to pivot about a fourth pivot axis $P_4$ which is a stationary or fixed pivot axis with respect to the vehicle body 16 and the retractable step 26. Specifically, in the illustrated embodiment, the vehicle body 16 includes front and rear attachment flanges 56F and 56R that are non-movably fixed relative to the support frame 30. The retractable step 26 is pivotally mounted to these flanges 56F and 56R to pivot about the fourth pivot axis $P_4$ between the stowed position illustrated in FIGS. 2, 4, 7 and 10 and the deployed position illustrated in FIGS. 3, 6, 9 and 11. Thus, the retractable step 26 is pivotally mounted to the vehicle body 16 about the fourth pivot axis $P_4$. The fourth pivot axis $P_4$ constitutes a step pivot axis of the retractable step 26.

Figure 10:
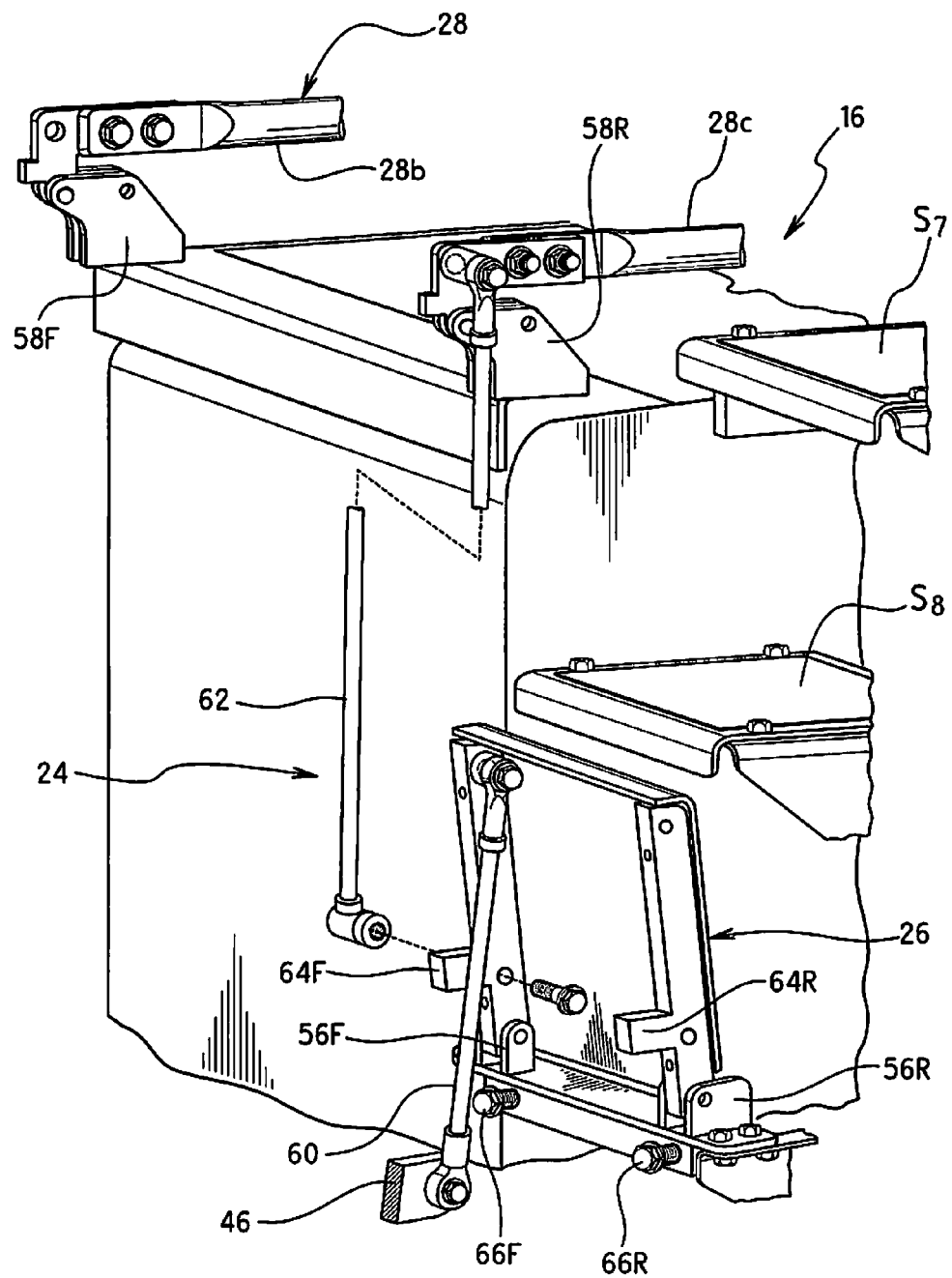
FIG. 10 is a perspective view of the vehicle body, the retractable step and the retractable handrail with selected parts being shown in an exploded state.

The retractable step 26 includes front and rear projections 64F and 64R, which are arranged to contact front and rear bolts 66F and 66R as seen in FIGS. 10-12. The position of the bolts 66F and 66R can be adjusted to adjust the contact point between the front and rear projections 64F and 64R and the front and rear bolts 66F and 66R. The front and rear projections 64F and 64R are examples of abutments that contact the bolts 66F and 66R. The bolts 66F and 66R are examples of adjustable stops for supporting the retractable step 26. At least one stationary step $S_8$ is located above the retractable step 26 and disposed inwardly toward the center C of the vehicle body 16 with respect to the retractable step 26. The retractable step 26 and the stationary step $S_8$ are at least partially aligned as viewed in a lateral direction of the vehicle body 16 with the step or platform $S_7$. Thus, the retractable step 26 and the stationary step $S_8$ also form parts of the user access path P traversing in the lateral direction the vehicle body 16. Due to this arrangement, a user can walk from one side $L_2$ of the vehicle body 16 to the opposite side $L_1$ and back. The various serviceable components can be inspected, serviced, repaired and/or have debris removed therefrom by the user from the access path P. In addition, the fuel fill FF can be accessed from the retractable step 26.

The railings $R_1$ to $R_4$, the steps or the user support platforms $S_1$ to $S_8$ as well as the retractable step 26, the retractable handrail 28 are designed for better compliance with International Standards ISO 11850, ISO 2860 and ISO 2867. In particular, the retractable step 26 and the retractable handrail 28 are designed for better compliance with these ISO standards. With the provision of the retractable step 26, a person can easily walk along the side portion 40 of the vehicle cover 20 and step onto the retractable step 26 while the vehicle cover 20 is in the open position. The retractable handrail 28 is also positioned so that a person using the retractable step 26 and the steps $S_7$ and $S_8$ can easily grab the retractable handrail 28.

In the illustrated embodiment, the retractable handrail 28 is an inverted U-shaped member disposed on the first lateral side $L_1$ of the vehicle body 16. Basically, the retractable handrail 28 has a first (middle) rail portion 28a, a second (front leg) rail portion 28b and a third (rear leg) rail portion 28c. As seen in FIG. 7, the first, second and third rail portions 28a, 28b and 28c are horizontally arranged above the upper surface of the vehicle body 16 with the retractable handrail 28 in the stowed position. As seen in FIG. 9, the first, second and third rail portions 28a, 28b and 28c are vertically arranged with the retractable handrail 28 in the deployed position. The retractable handrail 28 has a pair of free ends pivotally attached to the vehicle body 16 to pivot about a fifth pivot axis $P_5$ which is a stationary or fixed pivot axis with respect to the vehicle body 16. The fifth pivot axis $P_5$ constitutes a handrail pivot axis of the retractable handrail 28. Specifically, in the illustrated embodiment, the vehicle body 16 includes front and rear attachment flanges 58F and 58R that are non-movably fixed relative to the support frame 30. The retractable handrail 28 is pivotally mounted to these flanges 58F and 58R to pivot about the fifth pivot axis $P_5$ between the stowed position illustrated in FIGS. 2, 4, 7 and 10 and the deployed position illustrated in FIGS. 3, 6, 9 and 11. Thus, the retractable handrail 28 is pivotally mounted to the vehicle body 16 about a handrail pivot axis (the fifth pivot axis $P_5$). The retractable handrail 28 is an inverted U-shaped member having a pair of free end portions pivotally mounted to the vehicle body 16.

Referring to FIGS. 10-12, in the illustrated embodiment a first link 60 is coupled between the side portion 40 of the vehicle cover 20 and the retractable step 26. A second link 62 is coupled between the retractable step 26 and the retractable handrail 28. The first link 60 has a first end pivotally coupled to the vehicle cover 20 about a sixth pivot axis $P_6$ which is a stationary or fixed pivot axis with respect to the vehicle cover 20 but a movable pivot axis with respect to the vehicle body 16. The first link 60 has a second end pivotally coupled to the retractable step 26 about a seventh pivot axis $P_7$ which is a movable pivot axis with respect to the vehicle body 16 but a stationary or fixed pivot axis with respect to the retractable step 26. The second link 62 has a first end pivotally coupled to the retractable step 26 about an eighth pivot axis $P_8$ which is a movable pivot axis with respect to the vehicle body 16 but a stationary or fixed pivot axis with respect to the retractable step 26. The second link 62 has a second end pivotally coupled to the retractable handrail 28 about a ninth pivot axis $P_9$ which is a movable pivot axis with respect to the vehicle body 16 but a stationary or fixed pivot axis with respect to the retractable handrail 28.

Referring to FIGS. 10-12, in the illustrated embodiment, the first to ninth pivot axes $P_1$ to $P_9$ are all parallel and extend in the front to aft direction of the vehicle body 16. The front of the cab 32 corresponds to the front of the vehicle body 16. In the illustrated embodiment, the second third pivot axes $P_2$ and $P_3$ are located above the first pivot axis $P_1$ so that actuation of the hydraulic cylinder 22 causes the vehicle cover 20 to pivot between the closed and open positions. In the illustrated embodiment, the fourth pivot axis $P_4$ is located above the second pivot axis $P_2$. In the illustrated embodiment, the fifth pivot axis $P_5$ is located above the fourth pivot axis $P_4$. The eighth pivot axis $P_8$ is located closer to the fourth pivot axis $P_4$ than to the seventh pivot axis $P_7$. In the illustrated embodiment, the vehicle cover 20, the retractable step 26 and the retractable handrail 28 are pivotally mounted to the vehicle body 16 about parallel pivot axes $P_1$, $P_4$, and $P_5$, respectively.

In the stowed position of FIG. 11, the ninth pivot axis $P_9$ is slightly offset in an outboard direction with respect to the fifth pivot axis $P_5$. Due to this arrangement, in the stowed position, the retractable handrail 28 is horizontally disposed, but the retractable step 26 is slightly inclined outwardly relative to the vertical direction. In the deployed position of FIG. 12, in the illustrated embodiment, the ninth pivot axis $P_9$ is slightly offset downwardly from the fifth pivot axis $P_5$.

In the illustrated embodiment, the first link 60, the second link 62, the mounting flanges 56F and 56R, and the mounting flanges 58F and 58R mainly form the deployment structure 24. Thus, in the illustrated embodiment, the deployment structure 24 includes at least one link (e.g., the link 60 and/or the link 62) that interconnecting the at least one user support member (e.g., the retractable step 26 and/or retractable handrail 28) and the vehicle cover 20 to move the at least one user support member from the stowed position to the deployed position as the vehicle cover 20 moves from the closed position to the open position. In any case, the deployment structure 24 is operatively coupled to the at least one user support member (the retractable step 26 and/or retractable handrail 28) to move the at least one user support member from the stowed position to the deployed position in response to movement of the vehicle cover 20 from the closed position to the open position.

In the illustrated embodiment, the retractable step 26 can be considered a first user support member, and the retractable handrail 28 can be considered a second user support member. Thus, in the illustrated embodiment, the at least one user support member includes a first user support member and a second user support member, with the first user support member being connected to the first link 60. In addition, the deployment structure further includes the second link 62 interconnecting the first user support member and the second user support member to transmit movement of the first user support member to the second user support member, the first link 60 having a first end connected to the vehicle cover and a second end connected to the first user support member.

The first end of the first link 60 is pivotally connected to the vehicle cover 20 and the second end of the first link 60 is pivotally connected to the first user support member at a location that is offset from the fourth (step) pivot axis $P_4$. The second link 62 has a first end pivotally connected to the retractable step 26 and a second end pivotally connected to the retractable handrail 28 at a location that is offset from the fifth (handrail) pivot axis $P_5$.

In addition, the at least one user support member is disposed within the outer periphery OP of the vehicle body 16 when in the stowed position and the vehicle cover 20 is in the closed position as seen in FIG. 4, and the at least one user support member projects outwardly from the outer periphery OP of the vehicle body 16 when in the deployed position and the vehicle cover 20 is in the open position as seen in FIG. 6. Furthermore, the at least one user support member is disposed in one of a vertical orientation and a horizontal orientation in the stowed position, and the at least one user support member is disposed in the other of the vertical orientation and the horizontal orientation in the deployed position.

With the above structure, a method can be carried out, which basically includes moving the vehicle cover 20 from a closed position to an open position, and moving at least one user support member (e.g., the retractable step 26 and/or the retractable handrail 28) from a stowed position to a deployed position in response to movement of the vehicle cover 20 from the closed position to the open position. In the illustrated method, the at least one user support member (e.g., the retractable step 26 and/or the retractable handrail 28) reaches the deployed position when the vehicle cover 20 opens completely, the at least one user support member (e.g., the retractable step 26 and/or the retractable handrail 28) reaches the stowed position when the vehicle cover 20 closes completely.

Many parts of the work vehicle are conventional components that are well known in the work vehicle field. Since these components are well known in the work vehicle field, these structures will not be discussed or illustrated in detail herein, except as related to the invention set forth in the following claims.

As used herein, the following directional terms "forward, rearward, above, downward, vertical, horizontal, below and transverse" as well as any other similar directional terms refer to those directions of a work vehicle on a level surface.

Accordingly, these terms, as utilized to describe the present invention should be interpreted relative to a work vehicle equipped with the present invention. The terms of degree such as "substantially", "about" and "approximately" as used herein mean a amount of deviation of the modified term such that the end result is not significantly changed.

While only selected embodiments have been chosen to illustrate the present invention, it will be apparent to those skilled in the work vehicle field from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A work vehicle comprising:
a vehicle body supporting at least one serviceable component;
a vehicle cover movably mounted to the vehicle body to move between a closed position and an open position, the vehicle cover covering the at least one serviceable component in the closed position, and the vehicle cover permitting access to the at least one serviceable component in the open position;
at least one user support member movably mounted to the vehicle body to move between a stowed position and a deployed position; and
a deployment structure operatively coupled to the vehicle cover and the at least one user support member such that movement of the vehicle cover from the closed position to the open position, through the deployment structure, causes the at least one user support member to move from the stowed position to the deployed position,
the at least one user support member being disposed in an area covered by the vehicle cover when the cover is in the closed position, with the area being uncovered by the vehicle cover when the vehicle cover is in the open position.

2. The work vehicle according to claim 1, wherein
the at least one user support member includes a retractable handrail.

3. The work vehicle according to claim 2, wherein
the retractable handrail is disposed on a lateral side of the vehicle body.

4. The work vehicle according to claim 1, wherein
the at least one user support member includes a retractable step.

5. The work vehicle according to claim 4, wherein
the at least one user support member further includes a retractable handrail.

6. The work vehicle according to claim 1, further comprising
a hydraulic cylinder operatively connected between the vehicle body and the vehicle cover to move the vehicle cover between the closed position and the open position in response to actuation of the hydraulic cylinder.

7. The work vehicle according to claim 1, wherein
the deployment structure includes a first link interconnecting the at least one user support member and the vehicle cover to move the at least one user support member from the stowed position to the deployed position as the vehicle cover moves from the closed position to the open position.

8. A work vehicle comprising:
a vehicle body supporting at least one serviceable component;
a vehicle cover movably mounted to the vehicle body to move between a closed position and an open position, the vehicle cover covering the at least one serviceable component in the closed position, and the vehicle cover permitting access to the at least one serviceable component in the open position;
a first user support member movably mounted to the vehicle body to move between a first stowed position and a first deployed position;
a second user support member movably mounted to the vehicle body to move between a second stowed position and a second deployed position; and
a deployment structure operatively coupled to the vehicle cover and the first and second user support members such that movement of the vehicle cover from the closed position to the open position, through the deployment structure, causes
the first user support member to move from the first stowed position to the first deployed position and
the second user support member to move from the second stowed position to the second deployed position,
the deployment structure including a first link interconnecting the first user support member and the vehicle cover to move the first user support member from the first stowed position to the first deployed position as the vehicle cover moves from the closed position to the open position, and
the deployment structure including a second link interconnecting the first user support member and the second user support member to transmit movement of the first user support member to the second user support member, the first link having a first end connected to the vehicle cover and a second end connected to the first user support member.

9. The work vehicle according to claim 8, wherein
the first user support member is a retractable step,
the second user support member is a retractable handrail, and
the retractable handrail is pivotally mounted to the vehicle body about a handrail pivot axis.

10. The work vehicle according to claim 9, wherein
the retractable handrail is an inverted U-shaped member having a pair of free end portions pivotally mounted to the vehicle body.

11. The work vehicle according to claim 9, wherein
the retractable step is pivotally mounted to the vehicle body about a step pivot axis.

12. The work vehicle according to claim 11, wherein
the first end of the first link is pivotally connected to the vehicle cover and the second end of the first link is pivotally connected to the first user support member at a location that is offset from the step pivot axis.

13. The work vehicle according to claim 12, wherein
the second link has a first end pivotally connected to the retractable step and a second end pivotally connected to the retractable handrail at a location that is offset from the handrail pivot axis.

14. The work vehicle according to claim 9, further comprising
at least one stationary step located above the retractable step and disposed inwardly toward a center of the vehicle body with respect to the retractable step.

15. The work vehicle according to claim 9, wherein
the vehicle cover, the retractable handrail and the retractable step are pivotally mounted to the vehicle body about parallel pivot axes.

16. The work vehicle according to claim 1, wherein
the vehicle cover defines a portion of an outer periphery of the vehicle body when the vehicle cover is in the closed position, the at least one user support member is disposed within the outer periphery of the vehicle body when in the stowed position and the vehicle cover is in the closed position, and the at least one user support member projects outwardly from the outer periphery of the vehicle body when in the deployed position and the vehicle cover is in the open position.

17. The work vehicle according to claim 1, wherein
the at least one user support member is disposed in one of a vertical orientation and a horizontal orientation in the stowed position, and the at least one user support member is disposed in the other of the vertical orientation and the horizontal orientation in the deployed position.

18. The work vehicle according to claim 1, further comprising
a work implement movably attached the vehicle body, the work implement including a feller head.

19. A method for a work vehicle including a vehicle body supporting at least one serviceable component, a vehicle cover movably mounted to the vehicle body to move between a closed position and an open position, at least one user support member movably mounted to the vehicle body to move between a stowed position and a deployed position, and a deployment structure, the method comprising:

moving the vehicle cover from the closed position to the open position, the vehicle cover covering the at least one serviceable component in the closed position, and the vehicle cover permitting access to the at least one serviceable component in the open position; and moving at least one user support member from a stowed position to a deployed position in response to movement of the vehicle cover from the closed position to the open position, the deployment structure being operatively coupled to the vehicle cover and the at least one user support member such that movement of the vehicle cover from the closed position to the open position, through the deployment structure, causes the at least one user support member to move from the stowed position to the deployed position, the at least one user support member being disposed in an area covered by the vehicle cover when the cover is in the closed position, with the area being uncovered by the vehicle cover when the vehicle cover is in the open position.

20. The method according to claim 19, wherein
the at least one user support member reaches the deployed position when the vehicle cover opens completely;

the at least one user support member reaches the stowed position when the vehicle cover closes completely.

* * * * *